United States Patent [19]

Barr, Jr. et al.

[11] 3,951,627
[45] Apr. 20, 1976

[54] AIR FILTERING APPARATUS

[75] Inventors: Harry S. Barr, Jr.; Thomas E. Mullinax, both of Charlotte, N.C.

[73] Assignee: Pneumafil Corporation, Charlotte, N.C.

[22] Filed: Jan. 9, 1975

[21] Appl. No.: 539,827

[52] U.S. Cl. .................................. 55/284; 55/293; 55/294; 55/303; 55/337; 55/341 R; 55/359; 55/374; 55/379; 55/381; 55/478
[51] Int. Cl.$^2$ .......................................... B01D 41/00
[58] Field of Search ............ 55/284, 293, 294, 302, 55/303, 341, 337, 359, 374, 379, 381, 467, 472, 478, 492, 498, 500, 502, 511

[56] References Cited
UNITED STATES PATENTS

| | | | |
|---|---|---|---|
| 2,800,976 | 7/1957 | Pellon | 55/302 X |
| 2,974,748 | 3/1961 | Swanson | 55/341 X |
| 3,277,633 | 10/1966 | Smoot | 55/302 |
| 3,345,806 | 10/1967 | Bullock et al. | 55/293 |
| 3,356,215 | 12/1967 | Miles, Jr. | 55/302 X |
| 3,402,881 | 9/1968 | Moore et al. | 55/502 X |
| 3,487,609 | 1/1970 | Caplan | 55/293 X |
| 3,648,442 | 3/1972 | Bourne | 55/294 |
| 3,695,007 | 10/1972 | Farnworth | 55/341 X |
| 3,699,750 | 10/1972 | Nepereny et al. | 55/341 X |
| 3,777,458 | 12/1973 | Dence | 55/294 X |
| 3,813,853 | 6/1974 | Anderson | 55/302 X |
| 3,839,850 | 10/1974 | Jamiol | 55/341 |

FOREIGN PATENTS OR APPLICATIONS 977,881  12/1964  United Kingdom.................. 55/302

OTHER PUBLICATIONS

Young Uni-Cage Type VC Vertical Cylindrical Dust Collector, The Young Machinery Co., Inc., Muncy, Pa. Bulletin 233-200, 1967.

*Primary Examiner*—Frank W. Lutter
*Assistant Examiner*—Kathleen J. Prunner
*Attorney, Agent, or Firm*—Robert W. Fiddler

[57] ABSTRACT

An improvement in air filtering apparatus of the type having means for providing intermittent reverse flow of air through the filter media of the apparatus to dislodge any accumulations of material from the filter media. Such apparatus is conventionally formed with a collecting air chamber receiving the air to be filtered, which is then fed to a filtered air chamber separated from the collecting chamber by a grid plate with air passages therethrough. Filter media such as filter bags or the like are arranged in the grid plate air passages to filter the air passing through to the filtered air chamber. The invention provides an improved air plenum blower fan arrangement providing a relatively straight reverse air flow path from the fan discharge to improve the efficiency of air transfer between the fan and the filter media to effect desired cleaning of the filter media. A novel arrangement of flexible air conduits is provided on the plenum to insure desired reverse air flow, and a slide plate is arranged between the flexible reverse air conduits and grid plate to facilitate movement of the plenum and conduits. Additionally, an improved filter bag mounting flange is provided implementing replacement of the filter medium from the top of the grid plate, which is formed of a multi-segment construction to facilitate replacement and maintenance.

8 Claims, 5 Drawing Figures

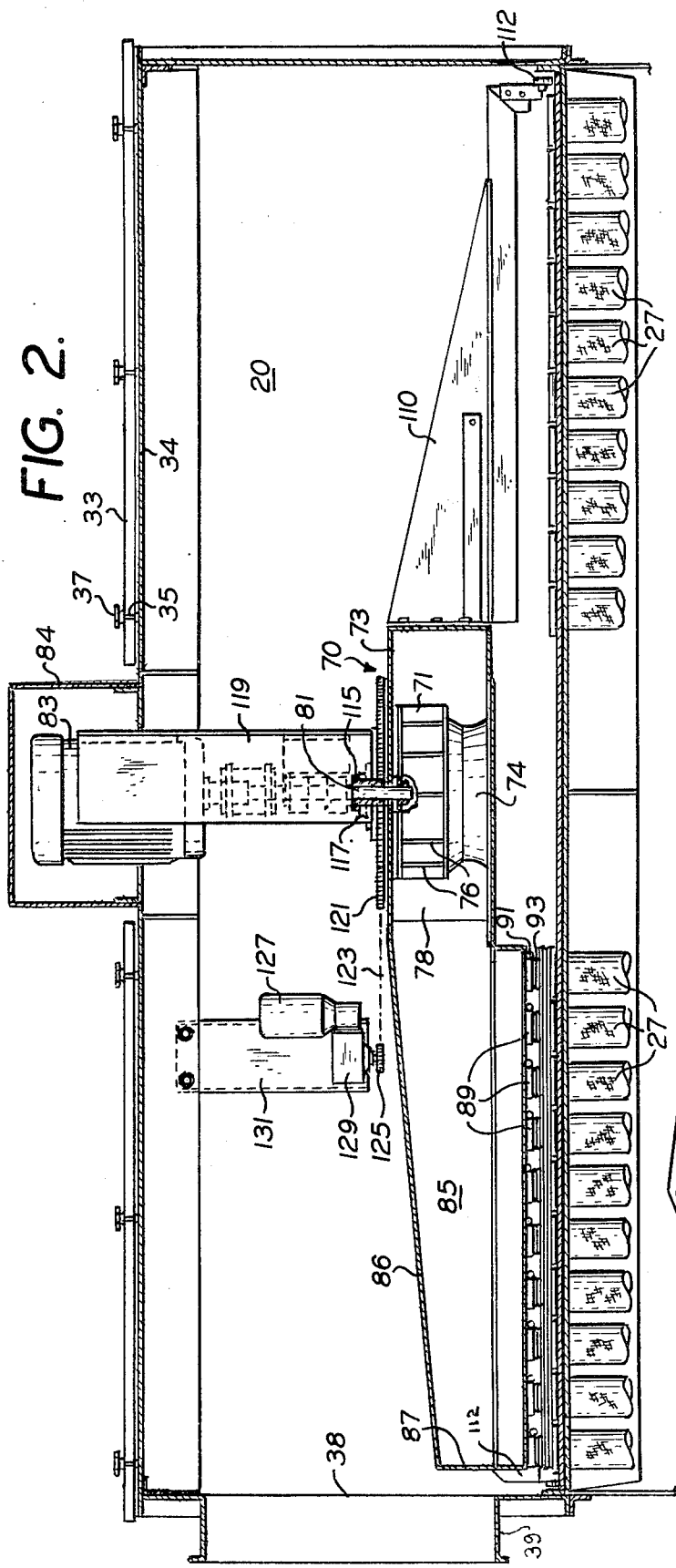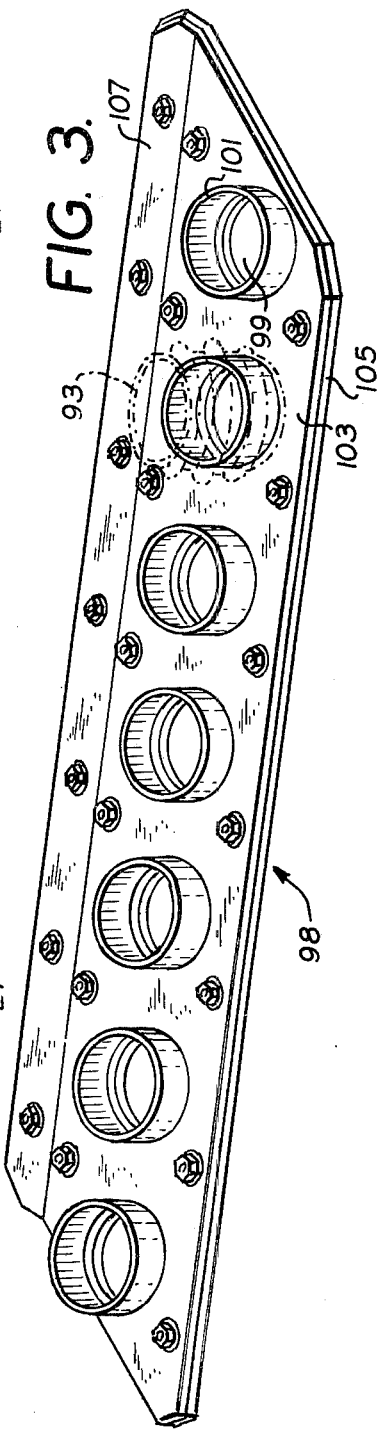

AIR FILTERING APPARATUS

BACKGROUND OF THE INVENTION

This invention relates to the art of air filtering apparatus, and more particularly to air filtering apparatus in which a reverse air stream blowing in a direction contrary to the direction of flow of the filtered air stream is intermittently directed through the filter medium of the apparatus to dislodge any foreign matter accumulating on the filter medium surface.

A variety of air filtering apparatus has long been known and used in connection with industrial facilities where the industrial processes involved produce undesirable quantities of airborne foreign material. Thus, such air filtering apparatus finds relatively widespread use in lumber mills, furniture factories, textile mills and the like.

Among the air filtering apparatus which has been evolved for use in this connection are so-called "reverse cleaning bag filters" in which the air to be filtered is collected in a collecting air chamber and passed through the walls of a dust bag, with the walls of the dust bag providing a filter medium entraining the foreign matter in the air stream. Thereafter, the filtered air moves from the dust bag to a filtered air chamber which is maintained at an air pressure lower than that of the collecting chamber, so as to insure the flow of air from the collecting air chamber through the dust bags into the filtered air chamber. A plenum is mounted in the filtered air chamber to intermittently direct air in a reverse flow direction (that is in a direction counter to the flow of the filtered air stream) through the dust bag to displace any filtered material accumulating on the surface of the dust bag. Swanson, in U.S. Pat. Nos. 2,844,216 and 2,974,748, discloses filtering apparatus of the type here involved. As disclosed in these Swanson patents, the filtering apparatus is formed with a lower collecting air chamber in which the air containing the foreign matter is received. A filtered air chamber is arranged above the collecting air chamber, and these chambers are separated by a grid plate containing a plurality of air passages. Dust bags are arranged beneath the grid plate, with the dust bags extending into the collecting air chamber. The air to be filtered is fed into the collecting air chamber, passed through the side walls of the dust bags in the collecting air chamber, then up through the interior of the dust bag through the air passages in the grid, and into the filtered air chamber from which it is discharged. In the filtered air chamber, means are provided for intermittently directing a reverse flow of air from the filtered air chamber down through the filter bags, back into the collecting air chamber. This reverse air flow serves to dislodge any filtered material accumulating on the surface of the dust bags and interfering with desired filtering action.

In the Swanson U.S. Pat. No. 2,844,216, the means for providing for reverse air flow comprises a cylinder and a piston mounted therein for reciprocatory movement, with the cylinder outlet subject to movement into alignment with one of the dust bag outlets so that the piston may drive air from the cylinder into the dust bag in a reverse flow direction.

In the later Swanson U.S. Pat. No. 2,974,748, reverse flow is provided by a manifold moveably coupled to a discharge plenum coupled to a blower mounted on top of the filtered air chamber, which is additional to the blower employed to effect air movement into the collecting air chamber. The manifold is mounted for movement over the grid plate and leads to a casing containing a valve, which is intermittently opened to permit air to flow from the manifold in a reverse direction through the filter bag. This later Swanson development serves to eliminate the problems in maintaining and operating the piston and cylinder arrangement of the earlier Swanson apparatus. However, as will be apparent to those skilled in the art, the Swanson arrangement shown in the later U.S. Pat. No. 2,974,748 presents a number of manufacturing and maintenance problems, serving to significantly increase the cost of manufacture and maintenance.

Thus, Swanson provides a relatively complex air path in which the direction of air flow is changed several times as it flows from the reverse air blower to the air chamber to the return air manifold creating inefficiency of air transfer between the blower and filter, increasing production, operation and maintenance costs. Additionally, Swanson employs a relatively complex valve structure for controlling the flow of air from the manifold to the dust filter, increasing costs of production and maintenance and providing areas of breakdown.

Additional problems arise in the use of the previously evolved air filtering apparatus of the type above discussed in delivering desired quantities of reverse flow air to the dust bags. To this end, the moving reverse air source, such as the manifold and valve, or piston-cylinder arrangements of Swanson must move over the grid plate between the collecting chamber and filtered air chamber effecting a relatively air tight flow path between the reverse air source and the filter bag outlet. Any foreign material inadvertently accumulated on the grid plate tends to interfere with the free movement of the rigid valve housing or cylinder of Swanson over the grid plate, so that a loosened screw or washer, or an accumulation of foreign matter not retained by the filter bags can often produce jamming of the valve housing or cylinder, interfering with the desired air tight reverse air flow path.

Additionally, previously evolved filtering apparatus has generally required that the dust or filter bags be removed from the lower collection chamber. Since these collection chambers are relatively dirty as compared to the filtered air chamber, and in practice are often 6 to 10 feet in height, it is necessary for a maintenance worker to reach up in a relatively dirty environment to replace the filter bags, creating an uncomfortable and inefficient working situation.

Further, previous reverse cleaning filters have employed grid plates formed of a unitary sheet, so that damage to any part of the grid plate requires replacement of the entire plate.

SUMMARY OF THE INVENTION

It is with the above considerations in mind that the present improved air filtering apparatus has been evolved providing a relatively simple and efficient air flow system for extablishing desired reverse air flow through the filter elements to dislodge any foreign matter accumulated on the surface of the filter elements. Means are further provided to insure effective direction of the reverse air stream to the filter elements, which are mounted for ready removal and replacement from the relatively clean filtered air chamber, permitting maintenance personnel to operate from above the filter element. Additionally, the improved filtering apparatus is provided with a filter element supporting grid plate subject to installation and replacement in parts.

It is accordingly among the primary objects of this invention to provide air filtering apparatus with means for simply and effectively establishing a reverse flow of air through the filter elements to effect dislodgment of any filtered material from the surface of the filter elements.

Another object of the invention is to reduce power requirements for effecting desired reverse flow of air through the filter elements.

A further object of the invention is to provide an air filtering apparatus having reverse air flow means for purposes of cleaning the filtering elements of the apparatus with effective and simply manufactured and maintained means, facilitating the movement of the components defining the reverse flow air paths with respect to the other components of the apparatus.

An additional object of the invention is to provide an air filtering apparatus having a reverse air flow source for directing air in a direction counter to the flow of the filtering air stream through the filter elements of the apparatus, with means for insuring a relatively air tight connection between the reverse air flow source and the filter elements to insure effective distribution of the reverse air stream.

Another object of the invention is to provide an improved mounting for filter bag elements as used in filtering apparatus of the type having a lower air collection chamber, and an upper filtered air chamber, with the filtering elements subject to removal from the filtered air chamber side of the equipment, so that maintenance personnel may remove the filters while working in the relatively clean filtered air chamber, without having to reach up over their heads.

A further object of the invention is to provide a filter supporting grid plate in a reverse cleaning air filtering apparatus in which the grid plate is subject to ready installation, maintenance and replacement.

These and other objects of the invention which will become hereafter apparent are achieved by providing an air filtering apparatus comprising a collecting chamber in which air to be filtered is received. A filtered air chamber is arranged above this collecting chamber and is separated therefrom by a grid plate formed with a plurality of air passages permitting the flow of air between said chambers. Filter bags of an elongate cylindrical configuration formed of a filtering material comprising either woven, felted, or knit textile fibers is arranged over a supporting cage within the bag. At the upper end of the supporting cage, a flange is provided serving to sandwich an out-turned end of the filter bag between the flange and the upper surface of the grid plate. Simple fastening screws are employed to retain the flange in position at the top of the grid plate to thereby implement removal of the filter bags from the filtered air chamber. Desired clearance to effect bag removal is obtained by forming the filtered air chamber with removable top wall plates permitting the workmen to enter the filtered air chamber and remove the filter bags as desired. A movable plenum is rotatably mounted within the filtered air chamber, the plenum being provided with one or more reverse air openings to which are coupled flexible reverse air conduits extending between the plenum reverse air opening, and the opening from the filter bags and grid plate. According to a preferred embodiment of the invention, a centrifugal fan is mounted in the filtered air chamber, with the fan housing coupled to the plenum to generate air flow sufficient to create the necessary pressure differentials so as to produce flow of air from the collecting air chamber to the filtered air chamber and from the plenum to the reverse air conduits. In order to facilitate sliding passage of the reverse air conduits with respect to the grid plates, a slide plate is preferably positioned at the lower end of the conduits.

A feature of the invention resides in the coupling of the plenum to the blower housing with the plenum air flow axis aligned with the axis of flow of air from the blower housing to provide for a relatively smooth and direct air flow path, permitting maximum efficiency of air flow with minimal frictional losses.

Another feature of the invention resides in the formation of the flexible reverse air conduit permitting ready movement of the conduit over the grid plate with the conduit flexing out of the way of any irregularities on the grid plate surface or accumulations of dust or other foreign matter.

An additional feature of the invention resides in the use of a slide plate at the lower end of the conduit, implementing a desired tightness of connection between the conduit and the filter outlet, at the same time providing for a smoothness of movement of the conduit over the grid surface.

Another feature of the invention resides in the use of a simple flange arranged at the upper end of the filter bag cage permitting ready mounting of the filter with respect to the grid plate from a position in the relatively clean filtered air chamber, thereby implementing replacement and removal of the filter bag.

A further feature of the invention resides in the formation of the filter supporting grid plate in sections facilitating installation and replacement of the grid plate.

BRIEF DESCRIPTION OF THE DRAWINGS

The specific details of a preferred embodiment of the invention, and their mode of functioning, along with the best mode for practicing the invention, will be particularly pointed out in clear, concise and exact terms in conjunction with the accompanying drawings, wherein:

FIG. 2 is a cross-sectional view on line 2—2 of FIG. 1 through the filtered air chamber at the upper end of the apparatus showing the filtered air chamber, the plenum, blower housing, and filter bag mountings on the grid plate;

FIG. 3 is a perspective view looking down at the slide plate employed for facilitating movement of lower ends of the flexible reverse air conduits over the grid plate, showing a flexible conduit in phantom;

Referring now more particularly to the drawings, like numerals in the various figures will be employed to designate like parts.

Figure 1:
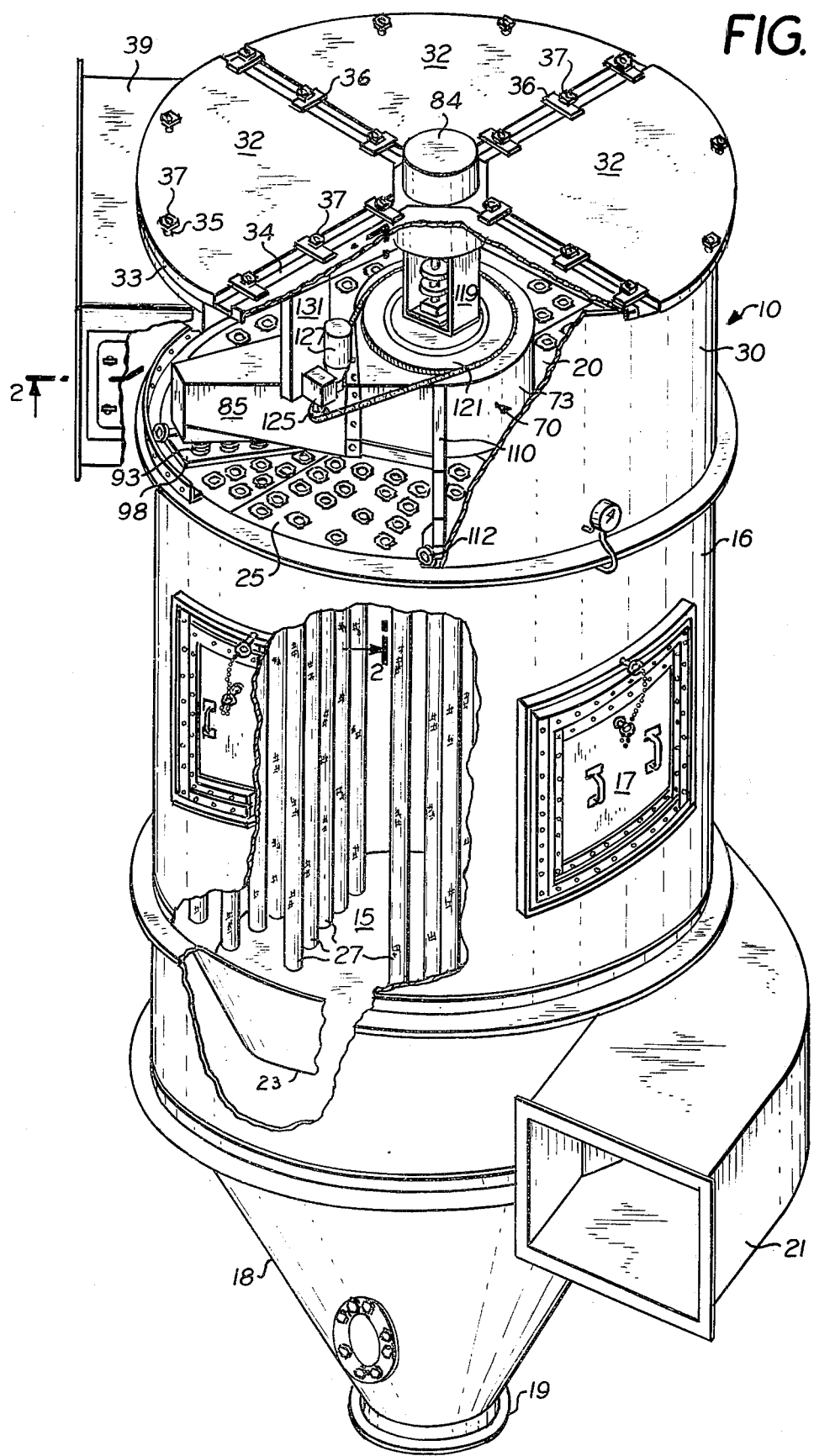
FIG. 1 is an elevational view in perspective of an air filtering apparatus made in accordance with the teachings of this invention, with parts of the housing broken away to show the interior details of the apparatus.

As best seen in FIG. 1, an air filtering apparatus 10 is illustratively shown embodying the inventive features. The air filtering apparatus 10 is of the type employing dust bags as filters with reverse flow filter cleaning.

The filtering apparatus 10, as illustratively shown in FIG. 1, comprises a casing formed in two parts 16 and 30. A lower air collecting chamber 15 is provided in lower casing 16 in which the dirt laden air to be filtered is received. Above the collecting chamber 15 is a filtered air chamber 20, provided in upper casing 30, receiving air from which the dirt has been removed, with the collecting air chamber 15 separated from the filtered air chamber 20 by a filter supporting grid plate 25.

The collecting chamber 15, as illustratively shown, is formed of a cylindrical configuration enclosed by a casing 16 of sheet metal or the like. The collection chamber casing 16 is preferably provided with pressure relief doors 17, which, as known by those skilled in the art, are conventionally employed to provide a safety relief in the event that the pressures within the chamber build up excessively. A conical hopper 18 is secured to the lower end of collection chamber casing 16 enclosing the lower end of the chamber and acting to funnel any heavier than air material out of the bottom of the chamber to a filtered material discharge outlet 19, which, as will be understood by those skilled in the art, may be coupled to suitable duct work to carry away the material filtered from the air stream, or may be provided with valving to permit selective discharge of the material collecting in the conical hopper-like bottom section 18. Arranged at the lower end of the collecting air chamber casing 16 is an air inlet duct 21 through which air passes to the collecting chamber, along a plane at the lower end of the collecting chamber. A cyclone air deflector 23 is seen in partial section at the lower left of FIG. 1 to deflect the entering air stream into a circumferential path about the interior of the collecting air chamber, permitting any relatively heavy particles moving in the air stream drawn into the air chamber to drop out of the air stream before it is exposed to the filtering action of the apparatus.

Figure 5:
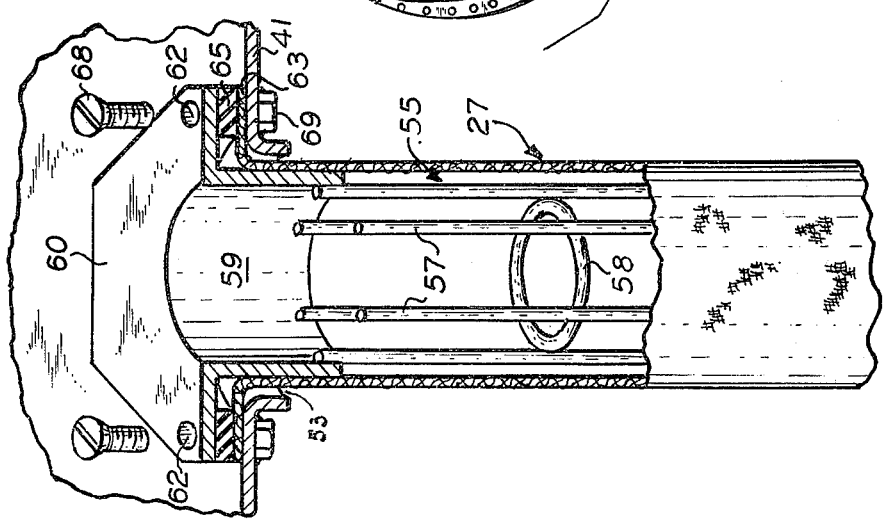
FIG. 5 is a perspective view, with parts broken away, through the top of a filter bag showing the filter bag mounting flange supporting the filter bag with respect to the grid plate.

Supported on the grid plate 25, separating the collecting air chamber 15 from the filter air chamber 20, are a plurality of filter bags 27, as will be more fully described in connection with FIG. 5. Filter bags 27, as seen in FIG. 1, depend from the grid plate into the collection chamber.

The filtered air chamber 20 is of a cylindrical configuration preferably of a diameter like that of the collecting air chamber 15, and the filtered air chamber casing 30, as illustratively shown, is formed separately from the collecting air chamber casing 16, and joined thereto to form a unitary structure. However, it will be apparent to those skilled in the art, that the filtered air chamber casing 30 and the collecting air chamber casing 16 may readily be formed of a single sheet of sheet metal should such be desired. Separate casings are illustratively shown for use in connection with the relatively large filtering apparatus employed. The upper confines of the apparatus, and the filtered air chamber 20 are formed by a plurality of filtered air chamber closure plates 32 resting on a flanged filtered air chamber closure framework 33, having cross-pieces 34. Studs or machine screws 35 are extended up from the framework 33. The studs 35 extending from the framework cross-pieces pass through pivot links 36, which can pivot on the studs from a position overlying the cross-pieces between plates 32 to a position overlying the plates. The studs at the circumferential periphery of the closure plates extend through peripheral openings in the plates as best seen in FIG. 1. Manually gripable nuts 37 are preferably threaded to the top of the studs 35 to permit selective removal of the plates.

The filtered air chamber is formed with a filtered air discharge outlet 38 leading to filtered air discharge duct 39, as best seen in FIG. 2.

Figure 4:
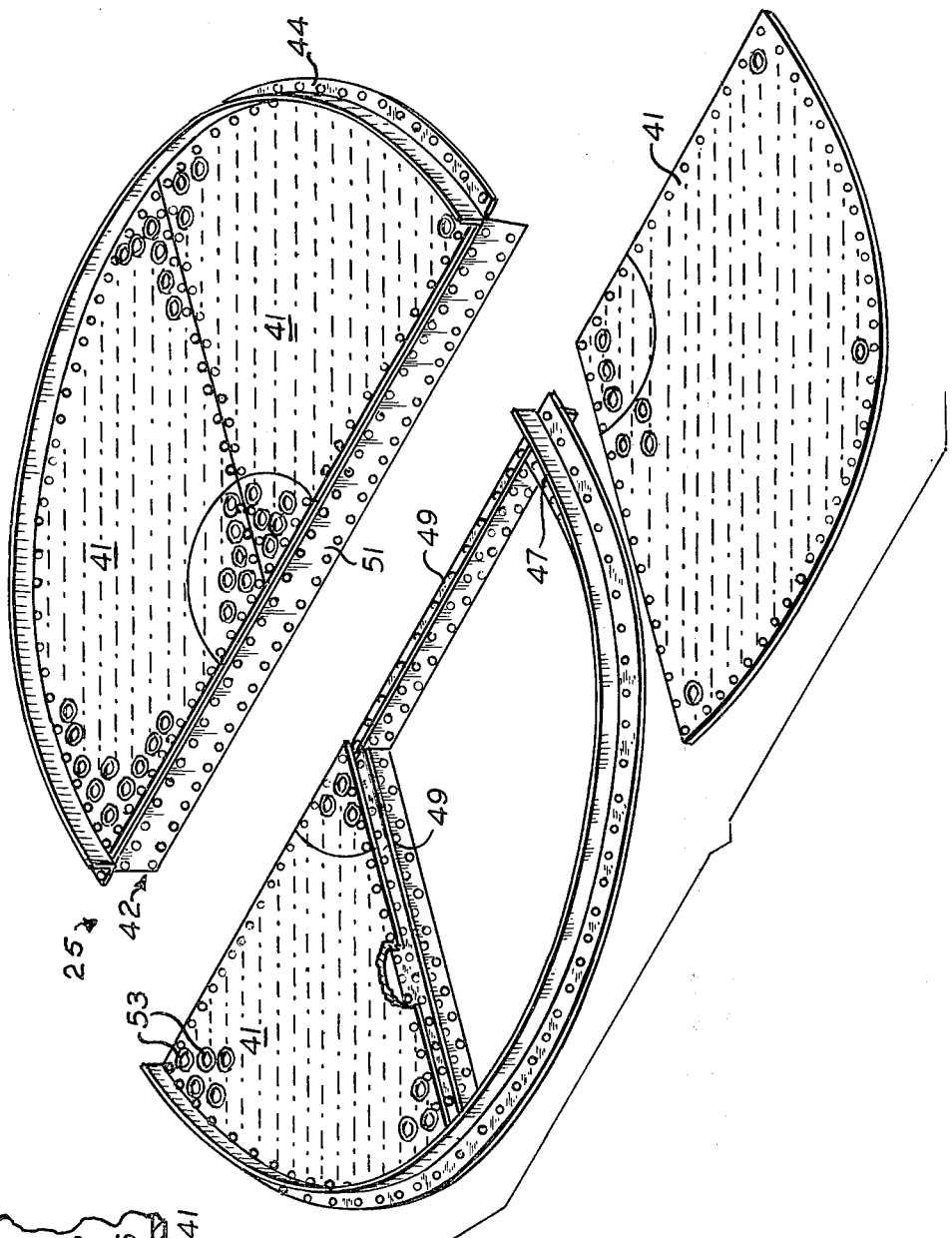
FIG. 4 is a perspective top plan view of a grid plate made in accordance with the teachings of the invention, showing one of the grid plate segments separated from the grid supporting framework, and showing the grid supporting framework separated to reveal the structural relationship between the components.

The filter supporting grid plate 25 separating the collecting air chamber 15 from the filtered air chamber 20 is best seen in FIG. 4, and in accordance with the teachings of this invention, is formed with a plurality of separable segments 41, four of which are illustratively shown in FIG. 4. A grid plate supporting framework 42, as illustratively shown in FIG. 4, is formed by a circular member, with an inwardly extending peripheral flange 47 and cross-pieces 49.

The cross-pieces 49 may be formed of angle stock with a downwardly extending vertical flange 51, so that the grid plate supporting framework 42 may, if desired, be shipped in parts, with assembly of the framework 42 merely requiring the bolting together of the downwardly extending flanges on the cross-pieces 49. As seen in FIGS. 1 and 4, the grid plate segments 41 are dimensioned to lie on and be supported by the flange 47 and the cross-pieces 49, and held in place by flat-headed screws.

The grid plate is formed with a plurality of spaced air passages 53, illustratively shown as of a circular configuration, dimensioned to permit the passage therethrough of the filter bag 27.

Filter bag 27 is of an elongate cylindrical configuration and is formed of a felted or woven filtering material with a porosity such as to permit the passage of air therethrough while retaining on the exterior surface thereof the particles which it is desired to filter from the air stream through the filter bag. In the illustrated embodiment, in order to maintain the walls of the filter bag in a separated configuration, as illustrated in FIG. 5, a filter bag supporting framework 55 is provided. This bag supporting framework 55 comprises a plurality of spaced rods 57 secured to spacer rings 58, extending the length of the bag. The upper end of the rods 57 are secured to a flanged collar 59 having flange 60 dimensioned to extend over the rim of grid plate air passage opening 53. Bolt holes 62 are formed in the flange 60 to permit securement of the flange to the grid plate 41, as best seen in FIG. 5. The bag 27 is formed with an outwardly extending peripheral top flap 63, dimensioned to underlie flange 60 and an annular gasket 65 is preferably arranged between the flange 60 and bag flap 63, as best seen in FIG. 5. As illustratively shown, the bag filter 27 is assembled with the supporting framework 55 and gasket 63, and positioned for use by extending the bag filter through the upper end of the air passage 53 in grid plate 25 until the flange 60, gasket 65 and bag flap 63 rest on the grid plate. Flat-headed machine screws 68 or the like are then extended through flange openings 62 into threaded nuts 69, which are preferably welded to the under surface of grid plate 41 to provide secure engagement of the filter bag 27.

The air handling system 70 for creating and directing desired air flow through the filtering apparatus is illustratively shown at the upper end of FIG. 1, and in FIG. 2. The air handling system 70 comprises a centrifugal blower 71 arranged in blower housing 73. Though a variety of centrifugal blowers may be employed, a fan such as the Chicago SISW air foil fan, sold by the Chicago Blower Corp. of Glendale Heights, Illinois, is found eminently suitable. This fan, as best seen in FIG. 2, is formed with a venturi inlet 74 and a plurality of radially extending air foil fan blades 76 directing the air from the venturi inlet 74 through the blower housing 73 to the housing outlet 78. The air foil blades 76 are mounted on blower shaft 81 for rotation therewith. Blower shaft 81 is coupled to the shaft of blower drive motor 83 secured to the top of air filter chamber casing 30. As illustratively seen in FIG. 2, the blower motor 83 is preferably enclosed in a motor housing 84.

An air directing plenum 85, formed of sheet metal or the like, is extended from the blower housing outlet 78 with the plenum inlet coincident with the blower housing outlet 78, with the plenum extending along the axis of air flow from the blower housing. The upper wall 86 of plenum 85 is downwardly slanted to direct the air flow from the housing 73 down to the reverse air openings. The end 87 of the plenum remote from blower housing 73 is preferably closed. Reverse air openings 89 are formed in the lower wall of plenum 85, as best seen in FIG. 2, and each of these reverse air openings 89 in the plenum are preferably provided with a collar 91.

Secured to the collars 91 around reverse air openings 89 are flexible reverse air ducts 93, preferably formed of an extensible hosing material, such as accordian pleated air hosing, as most clearly seen in phantom in FIG. 3.

In order to minimize friction at the lower end of reverse air conduits 93, a slide plate 98, as best seen in FIG. 3, is secured at the lower end of a row of reverse air conduits. The slide plate 98, as seen in FIG. 3, is formed with a plurality of spaced openings 99 of a diameter corresponding to or slightly smaller than the diameter of the interior of filter bags 27, and with a spacing corresponding to the spacing between the conduits in a row of reverse air conduits on the plenum. Collars 101 are formed about the plate opening 99, and the conduits are connected between the slide plate collars 101, and the plenum reverse air opening collars 91 by means of suitable hose clamps or the like. The slide plate is preferably formed of a laminar structure with an upper metallic plate 103 having a relatively friction-free plastic lower plate 105. A variety of high molecular weight polyethylene sheet material has been found suitable for forming the lower plate 105. The leading edge 107 of the slide plate 98, as best seen in FIGS. 1 and 3, is preferably angled up at an angle of approximately 30° to facilitate movement of the slide plate over any irregularities or accumulations on the surface of the grid plate 25.

An outrigger arm 110, as best seen in FIGS. 1 and 2, is preferably secured to the blower housing 73 to counterbalance the weight of the plenum 85. At the end of the outrigger arm 110 and at the free end of plenum 85, a roller wheel assembly 112 is preferably arranged to support the plenum and blower housing.

The plenum 85 and blower housing 73 are mounted for rotation in the filtered air chamber 20 about the blower axis which is coincident with the filtered air chamber axis, as best seen in FIGS. 1 and 2.

As illustratively shown in FIGS. 1 and 2, the mounting of the plenum and blower housing for rotation is accomplished by supporting the blower housing 73 on a sleeve bushing 115 mounted for rotation with respect to blower shaft 81, and bearing 117 secured on support 119 attached to the upper filter chamber closure framework 33. As will be apparent to those skilled in the art, the sleeve bushing 115 is held against axial slippage in bearing 117, while free to rotate therein. Secured to the top of blower housing 73 is a sprocket wheel 121, and sprocket chain 123 is trained over housing sprocket wheel 121, and drive sprocket wheel 125 driven by motor 127 through a speed reducer 129. Motor 127 and reducer 129 are supported on bracket 131, held on the framework 33, as best seen in FIG. 2.

OPERATION

In use, the air filtering apparatus 10 as above described is coupled to a source of air to be cleaned, such as the air handling system in a lumber mill, furniture factory, textile mill, or the like, where it is necessary for health and safety reasons to remove airborne particles from the air. As will be apparent to those skilled in the art, the air flow through the filtering apparatus 10 is provided by the air handling equipment of the air handling system to which the filter is coupled. Thus, air to be filtered may either be blown or drawn through the filter depending on the system in which employed.

The blower motor 83, and plenum rotating motor 127 are energized. The resulting rotation of blower 71 establishes air flow into the venturi inlet 74 and out through plenum 85 through the group of filter bags 27 over which the plenum is positioned at the time. The pressure drop created at venturi 74 creates a pressure differential between filtered air chamber 20 and collecting air chamber 15, with the lower pressure being in filtered air chamber 20, thus creating a flow of air into collecting air chamber 15 via collecting air chamber inlet 21. In the collecting air chamber, the collected air is drawn through the side walls of the filter bags 27, into the interior of the filter bags and up therethrough, through the grid plate air passages 53 into the filtered air chamber 20, into the blower venturi 74, from which it is thrown laterally by the action of blower 71 into the plenum 85.

The plenum 85, along with the blower housing, is moved over the grid plate in the filtered air chamber by the action of motor 127. When the reverse air conduits 93 are aligned with the openings in the grid plate forming grid plate air passages, air from the plenum 85 which is under greater pressure than the air in the collecting chamber, as a result of its confinement in plenum 85, is blown back through the filter bags to effect a dislodgment of any filtered material accumulating on the surface of the bag. Such reverse air blasts from the plenum 85 occur intermittently with respect to any given group of bags at the time that the reverse air conduits from the plenum are aligned with the particular row of filter bags, as can be seen from FIG. 1.

Replacement of the filter bags, and maintenance of the drive motors is attained by workmen operating in the relatively clean filtered air chamber, which is generally speaking relatively smaller and more accessable than the collecting air chamber. Access to the filtered air chamber is obtained by removing one or more of the cover plates 32 as seen in FIG. 1, by loosening the nuts 37 holding pivot links 36, swinging the pivot links to a position in alignment with the framework cross-pieces 34, and removing the circumferential nuts 37, and lifting the cover plate to permit access to the filter chamber 20. Thereafter, replacement of the filter bags 27 requires only the loosening of machine screws 68, as shown in FIG. 5, permitting the lifting out of the filter bag 27 along with its supporting framework 55.

Repair or replacement of the grid plate 25 is facilitated by removal of grid plate segments 41, which, as seen in FIG. 4, can be accomplished from the clean filtered air chamber, and requires merely loosening of the screws employed for holding the grid plate segment in position.

Movement of the reverse air conduits over the grid plate, as noted above, is facilitated by the slide plate 98. Any tendency of the reverse air conduits 93 to become jammed against an irregularity or material accumulation on the surface of the grid plate is substantially eliminated by virtue of the upturned leading edge 107 of the slide plate, which causes the slide plate to ride over any irregularities, or undesired material accumulation.

It is thus seen that an air filtering apparatus of the reverse flow filter bag type has been provided which is simple in maintenance and operation, providing a relatively direct air flow path between a blower and the filter bag to establish the desired reverse flow air stream.

The above disclosure has been given by way of illustration and elucidation and not by way of limitation, and it is desired to protect all embodiments of the herein disclosed inventive concept within the scope of the appended claims.

What is claimed is:

1. Air filtering apparatus for separating filterable material from an air stream, said apparatus comprising:
   a. a casing having an air inlet through which air to be filtered is received, and an outlet through which filtered air is discharged;
   b. a grid plate in said casing between the casing inlet and outlet dividing said casing into a collecting chamber on the side of the grid plate facing the air inlet end of said casing, and a filtered air chamber on the side of the grid plate facing the air outlet end of said casing, said grid plate having at least one air passage opening through which air may flow between said collecting chamber and filtered air chamber;
   c. a filter element in said grid plate air passage opening;
   d. a plenum moveably mounted in said filtered air chamber, said plenum having an air inlet and a reverse air stream outlet, said plenum intermittently moveable to a position aligning the reverse air stream outlet with the grid plate air passage opening;
   e. fan means coupled to said plenum establishing air flow through the plenum; said fan means comprising a centrifugal fan; a housing enclosing said fan in said filtered air chamber, said housing rotatable with respect to said fan in said filtered air chamber, said housing having an inlet opening facing said grid plate and an air outlet facing radially outwardly from said fan, said plenum being elongate and formed integral with said housing, with the housing outlet communicating with the plenum inlet, with the longitudinal axis of said plenum lying along the air flow path from said fan housing outlet;
   f. a reverse air conduit connected to the plenum reverse air outlet and extending between the plenum reverse air outlet and said grid plate, said conduit conducting a flow of reverse air from said plenum reverse air outlet to said grid plate air passage opening when said reverse air conduit is aligned with the grid plate air passage opening;
   g. a slide plate secured to the end of said reverse air conduit remote from said plenum and having a relatively friction free lower surface moving over said grid plate;
   h. an upturned leading edge on said slide plate extending upwardly and forwardly of said slide plate at an acute angle with respect to the plane thereof; and
   i. means for controlling the movement of said plenum.

2. Air filtering apparatus as in claim 1 in which said reverse air conduit is flexible.

3. Air filtering apparatus as in claim 1 in which said filter element comprises a filter bag extending into said collecting air chamber; a peripheral flap on said bag; a bag supporting framework in said filter bag; and a flanged collar on said framework, the flange on said flanged collar overlying said flap and sandwiching same between the flange and the top of said grid plate in said filtered air chamber, whereby said filter bag may be removed from the filtered air chamber side of said grid plate.

4. Air filtering apparatus as in claim 1 in which said grid plate comprises a plurality of grid plate segments, each formed with a plurality of air passage openings.

5. Air filtering apparatus as in claim 1 in which said filtered air chamber is provided with a plurality of selectively removable closure plates arranged at the top thereof to provide selective access to said filtered air chamber.

6. Air filtering apparatus as in claim 1 in which said slide plate is formed with a relatively friction free plastic plate to form the friction free lower surface.

7. Air filtering apparatus as in claim 1 in which said means for controlling movement of said plenum comprises a drive motor and a coupling between said drive motor and said plenum.

8. Air filtering apparatus as in claim 1 in which said plenum is formed with a wall inclined toward the reverse air stream outlet from said plenum air inlet.

* * * * *